US010860730B1

(12) United States Patent
Weaver et al.

(10) Patent No.: US 10,860,730 B1
(45) Date of Patent: Dec. 8, 2020

(54) BACKEND DATA CLASSIFIER FOR FACILITATING DATA LOSS PREVENTION IN STORAGE DEVICES OF A COMPUTER NETWORK

(71) Applicant: EMC IP Holding Company LLC, Hopkinton, MA (US)

(72) Inventors: James L. Weaver, Sterling, MA (US); Srinivasa R. Maguluri, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 372 days.

(21) Appl. No.: 15/897,224

(22) Filed: Feb. 15, 2018

(51) Int. Cl.
    *H04L 29/06*     (2006.01)
    *G06F 21/00*     (2013.01)
    (Continued)

(52) U.S. Cl.
    CPC ............ *G06F 21/604* (2013.01); *G06F 16/13* (2019.01); *G06F 16/219* (2019.01);
    (Continued)

(58) Field of Classification Search
    CPC ...... G06F 21/604; G06F 16/219; G06F 16/13; G06F 16/285; G06F 21/6218; H04L 63/1425
See application file for complete search history.

(56) References Cited

U.S. PATENT DOCUMENTS 8,650,166 B1 *  2/2014  Cook .................... G06F 16/164
    707/694
9,235,562 B1 *  1/2016  Hart ...................... G06F 40/279
(Continued)

FOREIGN PATENT DOCUMENTS

EP      3038003 A1    6/2016

OTHER PUBLICATIONS

N. Scaife et al., "CryptoLock (and Drop It): Stopping Ransomware Attacks on User Data," 36th International Conference on Distributed Computing Systems, Mar. 12, 2016, pp. 303-312.
(Continued)

*Primary Examiner* — Lisa C Lewis
(74) *Attorney, Agent, or Firm* — Ryan, Mason & Lewis, LLP (57) ABSTRACT

An apparatus in one embodiment comprises a processing platform that includes one or more processing devices each comprising a processor coupled to a memory. The processing platform is associated with at least one storage device. The processing platform comprises a backend data classifier configured for communication with a data loss prevention system. The backend data classifier comprises a file analyzer configured to compare characteristics relating to current states of respective files stored in the storage device with information stored in a file history database, and an assignment module configured to assign classifications to respective ones of the files stored in the storage device based at least in part on comparison results from the file analyzer. The data loss prevention system is configured to perform different data loss prevention operations on different ones of the files stored in the storage device based at least in part on their respective assigned classifications.

20 Claims, 2 Drawing Sheets

(51) Int. Cl.
*G06F 21/60* (2013.01)
*G06F 21/62* (2013.01)
*G06F 16/13* (2019.01)
*G06F 16/21* (2019.01)
*G06F 16/28* (2019.01)

(52) U.S. Cl.
CPC ........ *G06F 16/285* (2019.01); *G06F 21/6218* (2013.01); *H04L 63/1425* (2013.01)

(56) References Cited

U.S. PATENT DOCUMENTS

| | | | |
|---|---|---|---|
| 9,317,686 | B1 | 4/2016 | Ye et al. |
| 9,514,144 | B2 * | 12/2016 | Faitelson ................ G06F 9/54 |
| 9,594,514 | B1 | 3/2017 | Bono et al. |
| 9,805,204 | B1 * | 10/2017 | Nachenberg .......... G06F 16/951 |
| 10,489,587 | B1 * | 11/2019 | Kennedy ................ G06F 21/56 |
| 2009/0287751 | A1 * | 11/2009 | Hasegawa ............ G11B 27/105 |
| 2012/0131012 | A1 * | 5/2012 | Taylor ..................... G06F 16/14 |
| | | | 707/748 |
| 2012/0204260 | A1 * | 8/2012 | Cecil ..................... G06F 21/554 |
| | | | 726/22 |
| 2013/0055342 | A1 * | 2/2013 | Choi ..................... G06F 21/577 |
| | | | 726/1 |
| 2013/0163594 | A1 * | 6/2013 | Sharma ................ H04L 12/4633 |
| | | | 370/392 |
| 2013/0246334 | A1 * | 9/2013 | Ahuja ..................... G06F 16/93 |
| | | | 707/600 |
| 2014/0207968 | A1 * | 7/2014 | Kumar ..................... H04L 45/64 |
| | | | 709/244 |
| 2015/0180890 | A1 * | 6/2015 | Ronen ................. H04L 63/1416 |
| | | | 726/23 |
| 2015/0269386 | A1 * | 9/2015 | Khetawat ................ G06F 21/62 |
| | | | 726/1 |
| 2016/0283746 | A1 * | 9/2016 | Boshoff ............. H04N 1/32352 |
| 2017/0220476 | A1 | 8/2017 | Qi et al. |

OTHER PUBLICATIONS

U.S. Appl. No. 15/268,862, filed in the name of James L. Weaver et al. Sep. 19, 2016 and entitled "Automated Detection and Remediation of Ransomware Attacks Involving a Storage Device of a Computer Network."

Steve Cooper, "Data Classification as a Catalyst for DLP," https://www.boldonjames.com/data-classification-as-a-catalyst-for-dlp/, Feb. 1, 2018, 3 pages.

Titus, "Top Reasons for Data Classification," TITUS-SB-Classification-Ene/15-0002, Solution Brief, Feb. 25, 2016, 2 pages.

* cited by examiner

BACKEND DATA CLASSIFIER FOR FACILITATING DATA LOSS PREVENTION IN STORAGE DEVICES OF A COMPUTER NETWORK

FIELD

The field relates generally to computer networks, and more particularly to techniques for providing security in a computer network.

BACKGROUND

A computer network is typically configured to incorporate security functionality in order to protect the computers of the network against malicious activity. For example, many enterprise computer networks are configured to implement data loss prevention (DLP) systems that protect the enterprise against unauthorized or inadvertent leakage of sensitive data, possibly instigated by disloyal enterprise insiders. Although a wide variety of conventional techniques are known for implementing DLP as part of an overall data protection strategy of a corporation or other enterprise, improvements are needed in order to better identify and classify stored data.

SUMMARY

Illustrative embodiments of the invention provide techniques for backend data classification of stored files in a computer network. For example, some embodiments are configured to provide particularly accurate and efficient DLP functionality based on such backend data classification.

One or more of these embodiments are illustratively configured to identify and classify data using file inspection, possibly in conjunction with associated behavioral analysis, based on direct interaction with one or more storage devices. Such data classification is more particularly referred to herein as "backend" data classification as it is focused on using the storage devices for direct access. This type of direct access to the storage devices is in contrast to the indirect access typically associated with "frontend" components such as user devices, applications or dedicated devices which are configured to scan files or other repositories of data using indirect protocols such as Network File System (NFS) or Common Internet File System (CIFS).

In one embodiment, an apparatus comprises at least one processing platform that includes one or more processing devices each comprising a processor coupled to a memory. The processing platform is associated with at least one storage device. The processing platform comprises a backend data classifier configured for communication with a data loss prevention system. The backend data classifier comprises a file analyzer configured to compare characteristics relating to current states of respective files stored in the storage device with information stored in a file history database, and an assignment module configured to assign classifications to respective ones of the files stored in the storage device based at least in part on comparison results from the file analyzer. The data loss prevention system is configured to perform different data loss prevention operations on different ones of the files stored in the storage device based at least in part on their respective assigned classifications.

The backend data classifier in some embodiments may be implemented at least in part within the storage device. For example, the backend data classifier may be implemented as a component of a storage array. More particularly, the backend data classifier may be embedded in firmware of the storage array. Numerous other implementation arrangements are possible for the backend data classifier.

The assignment module in assigning classifications to respective ones of the files may be more particularly configured to label the respective files with the assigned classifications in metadata of those respective files. The file metadata comprising the labels is then made accessible to the data loss prevention system for use in controlling performance of data loss prevention operations.

Additionally or alternatively, file labels provided by the assignment module of the backend data classifier can be used for any of a wide variety of other types of downstream processing that can make use of such labels. For example, the file labels can be used to facilitate provision of data protection operations not provided by a data loss prevention system.

In some embodiments, the backend data classifier is configured to determine a classification for a given one of the stored files by examining the content and context of the given file. The given file is labeled with the classification by including the classification in its metadata. The metadata containing the classification is then utilized by downstream applications, including but not limited to those of the data loss prevention system for the purposes of tracking or preventing data leakage.

The backend data classifier in some embodiments is initially configured by an administrator to include in the file history database information characterizing a current state of at least a subset of the stored files. For example, the file history database may comprise one or more internal tables utilized to store such information.

A given one of the stored files can then be processed in the following manner by the backend data classifier.

1. Examine the file metadata and corresponding information in the internal table(s) to determine if the file has been previously processed by the backend data classifier.

2. If the file has been previously processed, but there have been no changes in the file's metadata, content, context or the corresponding information in the internal table(s), no further action is taken at this time for the given file, and the process ends for that file.

3. If the file has not been previously processed, or if the file has been previously processed but there have been changes in the file's metadata, content, context or the corresponding information in the internal table(s) since such previous processing, the process continues with step 4 below.

4. Update the internal table(s) to include the current state and metadata for the given file.

5. Examine the contents of the file.

6. If the file is unreadable, update the file's metadata and the internal table(s) to indicate an unreadable state for the file. One or more out-of-band actions may be taken at this point for the given file, and the process ends for that file.

7. If the file is readable, read the file and evaluate the file's content and context relative to the corresponding information in the internal table(s), and then update the file's metadata and the internal table(s) to indicate a new classification for the file. The new classification is accessible via the updated file metadata to downstream applications such as those of the data loss prevention system for the purposes of tracking or preventing data leakage, as well as other downstream applications providing other types of data protection operations not provided by the data loss prevention system.

The example process as described above may be repeated periodically for the given file, and separate instances of the process can be performed for respective additional ones of the stored files. Also, the particular process steps are presented by way of illustrative example only, and can be varied in other embodiments.

The data loss prevention system may be implemented at least in part on the same processing platform that implements the backend data classifier. Alternatively, the data loss prevention system may be implemented on an entirely separate processing platform than that used to implement the backend data classifier.

In some embodiments, the storage device is accessible to at least one user device over a network and the backend data classifier operates out-of-band relative to the user device such that no component of the backend data classifier is implemented on the user device.

The processing platform may be configured to controllably switch the backend data classifier between multiple distinct operating modes. Examples of such operating modes illustratively include a real-time processing mode in which the backend data classifier receives copies of respective ones of the files from the storage device in conjunction with the respective ones of the files being stored in the storage device, a scheduled direct access processing mode in which the backend data classifier accesses the storage device to identify and analyze at least a subset of the files that have been modified since a previous access by the backend data classifier to the storage device, and a transparent processing mode in which the backend data classifier processes the files in a manner transparent to the storage device as the files are provided to the storage device for storage therein.

A given processing platform configured with functionality for backend data classification for facilitating data loss prevention in a computer network may be implemented, for example, within or otherwise in association with one or more storage devices of the computer network, possibly as part of a security analytics system or other type of network security system associated with the computer network.

These and other illustrative embodiments include, without limitation, methods, apparatus, systems, computer networks and computer program products comprising processor-readable storage media.

DETAILED DESCRIPTION

Illustrative embodiments of the present invention will be described herein with reference to exemplary computer networks and associated computers, storage devices, processing platforms and processing devices. It is to be appreciated, however, that the invention is not restricted to use with the particular illustrative computer network, storage device, processing platform and processing device configurations shown. Accordingly, the term "computer network" as used herein is intended to be broadly construed, so as to encompass, for example, any system comprising multiple networked processing devices.

Figure 1:
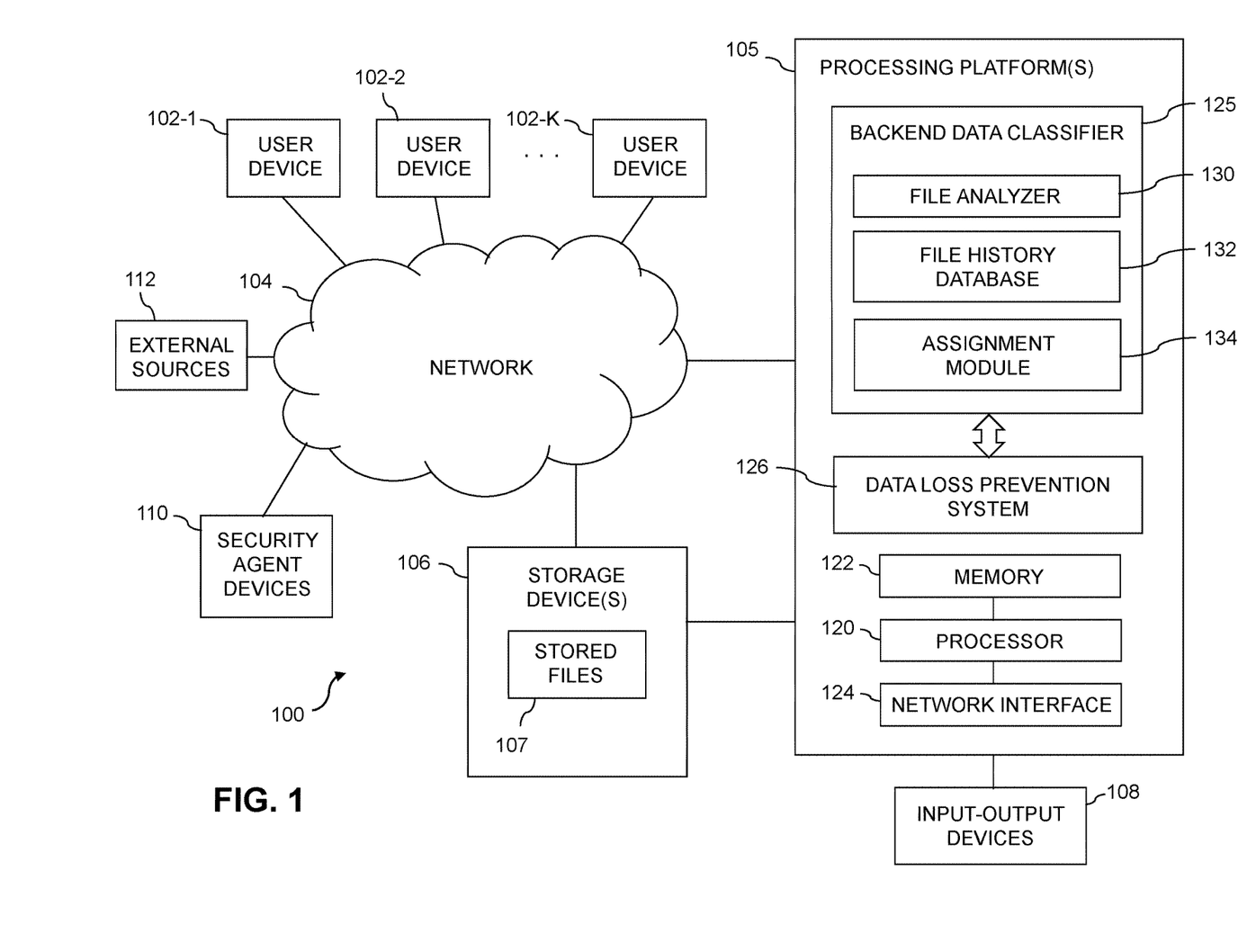
FIG. 1 is a block diagram of a computer network comprising a backend data classifier for facilitating data loss prevention in an illustrative embodiment.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a processing platform 105.

The user devices 102 may comprise, for example, mobile telephones, laptop computers, tablet computers, desktop computers or other types of devices capable of supporting user access to network resources. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Also included in the computer network 100 is at least one storage device 106 comprising stored files 107. Although element 106 may comprise multiple distinct storage devices, it will be used in subsequent description herein to refer to a single storage device. The storage device 106 is coupled to the network 104 and to the processing platform 105. The storage device 106 in the present embodiment is implemented using one or more storage systems associated with the processing platform 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC, of Hopkinton, Mass., a division of Dell Technologies Inc. Combinations of multiple ones of these and other storage products can also be used in implementing a given storage system in an illustrative embodiment.

The storage device 106 can illustratively comprise a single storage array, storage disk, storage drive or other type of storage device within the computer network 100. Alternatively, the storage device 106 can comprise one or more storage systems each having multiple storage devices implemented therein. The term "storage device" as used herein is therefore intended to be broadly construed. In some embodiments, a storage device may comprise a network share or possibly even an attached device such as a USB stick. Accordingly, in some embodiments, the storage device 106 may be attached to one or more of the user devices 102 in addition to or in place of being attached to the network 104. The stored files on the storage device may already be encrypted using a legitimate encryption process implemented by the user to protect the stored files from unauthorized access.

Although shown as separate from the storage device 106 in FIG. 1, the processing platform 105 in other embodiments can be implemented at least in part internally to the storage device 106. Accordingly, the processing platform 105 can be implemented externally to the storage device 106, as illustrated in the figure, or at least in part internally to the storage device 106. These arrangements are considered examples of different ways that the processing platform 105 may be "associated with" the storage device 106.

In some embodiments, the processing platform 105 is co-located with the storage device 106, for example, within a particular data center or other facility of a given enterprise. Alternatively, the processing platform 105 may be implemented in cloud infrastructure that is remote from the storage device 106.

Also associated with the processing platform 105 are input-output devices 108, which illustratively comprise keyboards, displays or other types of input-output devices in any combination. Such input-output devices are used to support one or more user interfaces to the processing platform 105, as well as to support communication between the processing platform 105 and other related systems and devices not explicitly shown.

In the present embodiment, alerts generated by the processing platform 105 are provided over the network 104 to one or more security agent devices 110. Such devices, like the user devices 102, can illustratively comprise mobile telephones, laptop computers, tablet computers, desktop computers, or other types of computers or processing devices configured for communication over network 104 with the processing platform 105. For example, a given security agent device can comprise a mobile telephone equipped with a mobile application configured to receive alerts from the processing platform 105 and to provide an interface for a security agent to select particular remedial measures for responding to the alert.

Examples of such remedial measures may include turning off, disconnecting or otherwise disabling or quarantining one or more of the user devices 102 that are determined to be associated with data loss or another security issue, such as a ransomware infection. Other types of remedial measures may include attempting to capture a cryptographic key utilized in an on-going ransomware attack.

It should be noted that a "security agent" as the term is generally used herein may comprise, for example, an automated entity, such as a hardware, software or firmware entity running on a processing device. Accordingly, like the above-noted "user," a security agent may but need not comprise a human entity.

In addition, user device agents may be associated with respective ones of at least a subset of the user devices 102. Such user agents can be configured to interact with the processing platform 105 in order to assist in the provision of data loss prevention or other types of security functionality within the computer network 100 using the techniques disclosed herein.

Illustrative examples of agents that can be used in some embodiments include agents implementing at least a portion of the functionality of an Enterprise Compromise Assessment Tool (ECAT), commercially available from RSA Security LLC ("RSA"), of Bedford, Mass., a division of Dell Technologies Inc.

The computer network 100 as illustrated in the figure also includes external sources 112 coupled to the network 104. Such external sources 112 may serve as sources of context or other types of current state information characterizing one or more of the stored files 107. Context or other information from the external sources 112 can be used, for example, in performing backend data classification in the processing platform 105 of computer network 100, as will be described in more detail below.

The processing platform 105 in the FIG. 1 embodiment is assumed to be implemented using at least one processing device. Each such processing device generally comprises at least one processor and an associated memory, and implements one or more functional modules for controlling certain features of the processing platform 105.

More particularly, the processing platform 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the processing platform 105 to communicate over the network 104 with the user devices 102, the storage device 106 and the security agent devices 110, and illustratively comprises one or more conventional transceivers.

The processing platform 105 in the present embodiment further comprises a backend data classifier 125 configured to assign classifications to respective files or sets of files stored in the storage device 106. The files or sets of files illustratively comprise at least a subset of the stored files 107.

The backend data classifier 125 in this embodiment is coupled to a data loss prevention system 126, also referred to herein as a DLP system. The DLP system 126 utilizes the data classifications provided by the backend data classifier 125 to facilitate the implementation of DLP functionality within the computer network 100.

In some embodiments, the backend data classifier 125 is configured to perform data classification using file inspection and associated behavioral analysis based on direct interaction with the storage device 106. Such behavioral analysis is also referred to herein as "backend" behavioral analysis as it is focused on direct access to the storage device 106 rather than on indirect access via "frontend" components such as the user devices 102. For example, backend data classification using direct access to the storage device 106 as disclosed herein can provide significant advantages relative to alternative arrangements using components such as user devices, applications or dedicated devices which are configured to scan files or other repositories of data using indirect protocols such as NFS and CIFS.

Although shown in this particular illustrative embodiment as being implemented externally to the storage device 106, the backend data classifier 125 in other embodiments can be implemented at least in part internally to the storage device 106. For example, in an embodiment in which the storage device 106 comprises a storage array, the backend data classifier 125 can be implemented in the form of software and/or firmware components installed within the storage array.

Numerous other arrangements are possible. For example, the backend data classifier 125 may be co-located with the storage device 106 on a common processing platform. Alternatively, the backend data classifier 125 may be implemented in cloud infrastructure remote from the storage device 106.

As indicated above, the storage device 106 is accessible to at least one of the user devices 102 over the network 104, and the backend data classifier 125 operates out-of-band relative to the user device such that no component of the backend data classifier is implemented on the user device.

The backend data classifier 125 comprises a file analyzer 130, a file history database 132 and an assignment module 134.

The file analyzer 130 is configured to compare characteristics relating to current states of respective ones of the files 107 stored in the storage device 106 with information stored in the file history database 132.

For example, the file analyzer 130 in some embodiments inspects files as they are stored on the storage device 106 and/or by direct access inspection on the storage device 106. Analysis is then performed on each file by comparing a current state of the file to its history as maintained in the file history database 132. Additional or alternative information that can be used in the analysis includes characteristics of the file, such as metadata of the file or its corresponding directory, and its relationships to other files. Combined information for multiple files can also be used, such as overall file change rate for a designated set of files.

Accordingly, in some embodiments, the file analyzer 130 of the backend data classifier 125 processes the files substantially contemporaneously with the files being stored in the storage device 106 by one or more of the user devices 102 coupled to the storage device 106 over the network 104.

The file analyzer 130 in comparing characteristics relating to the current states of the files with information stored in the file history database 132 applies a plurality of evaluation criteria to a given one of the files to obtain individual comparison results for respective ones of the evaluation criteria for the given file.

The file analyzer 130 in comparing characteristics relating to the current states of the files with information stored in the file history database 132 illustratively performs combined analysis over multiple ones of the files and generates one or more combined comparison results for the multiple files.

In some embodiments, the backend data classifier 125 is configured to determine a classification for a given one of the stored files 107 by examining the content and context of the given file. The given file is then labeled with the classification by including the classification in its metadata. The metadata containing the classification is then utilized by downstream applications, including but not limited to those of the DLP system 126 for the purposes of tracking or preventing data leakage.

The term "current state" as used herein is intended to include, by way of example and without limitation, at least one of metadata, content, context and potentially other related information characterizing the file.

In some embodiments, certain types of current state information relating to context of a given file can originate from one or more of the external sources 112. For example, a change in the context of a file can be detected by processing current state information obtained at least in part from one of the external sources 112.

As a more particular illustration, such a context change can include a change in the state of a user's active directory group membership, or other similar behavioral information relating to a file or an associated user.

The backend data classifier 125 in some embodiments is initially configured by an administrator to include in the file history database 132 information characterizing a current state of at least a subset of the stored files 107. For example, the file history database 132 may comprise one or more internal tables utilized to store such information.

A given one of the stored files 107 can then be processed in the following manner by the backend data classifier 125.

1. Examine the file metadata and corresponding information in the internal table(s) to determine if the file has been previously processed by the backend data classifier 125.

2. If the file has been previously processed, but there have been no changes in the file's metadata, content, context or the corresponding information in the internal table(s), no further action is taken at this time for the given file, and the process ends for that file.

3. If the file has not been previously processed, or if the file has been previously processed but there have been changes in the file's metadata, content, context or the corresponding information in the internal table(s) since such previous processing, the process continues with step 4 below.

4. Update the internal table(s) to include the current state and metadata for the given file.

5. Examine the contents of the file.

6. If the file is unreadable, update the file's metadata and the internal table(s) to indicate an unreadable state for the file. One or more out-of-band actions may be taken at this point for the given file, and the process ends for that file.

7. If the file is readable, read the file and evaluate the file's content and context relative to the corresponding information in the internal table(s), and then update the file's metadata and the internal table(s) to indicate a new classification for the file. The new classification is accessible via the updated file metadata to downstream applications such as those of the DLP system 126 for purposes of tracking and preventing data leakage in the computer network 100. It may also be accessible to other downstream applications providing other types of data protection operations not provided by the DLP system 126.

The example process as described above may be repeated periodically for the given file, and separate instances of the process can be performed for respective additional ones of the stored files 107. Also, the particular process steps are presented by way of illustrative example only, and can be varied in other embodiments.

The assignment module 134 is configured to assign classifications to respective ones of the files 107 stored in the storage device 106 based at least in part on comparison results from the file analyzer 130. Additionally or alternatively, classifications can be assigned to respective sets of the stored files 107. It should be noted that a given "set of files" as that term is used herein may include only a single file or multiple files. A classification can therefore be generated for a single file or for a set of multiple files.

One possible example of a set of classifications that may be used to classify different ones of the stored files 107 includes External Public, Internal Use, Restricted and Highly Restricted, although numerous additional or alternative classifications may be assigned to particular ones of the stored files 107 by the assignment module 134 based on file analysis performed by the file analyzer 130 utilizing the file history database 132.

The DLP system 126 is configured to perform different data loss prevention operations on different ones of the files 107 stored in the storage device 106 based at least in part on their respective assigned classifications. For example, particular ones of the stored files 107 having a first classification indicative of a relatively high level of access restriction within the computer network 100 may be subject to certain types of additional data loss prevention operations that are not applied to other ones of the stored files 107 having second classification, different than the first classification, that is indicative of a relatively low level of access restriction within the computer network 100.

The DLP system 126 may therefore modify the manner in which the stored files 107 are accessed from the user devices 102 based at least in part on the classifications assigned to respective ones of those files by the backend data classifier 125. Such access modifications for different ones of the stored files 107 are considered examples of "data loss prevention operations" as that term is broadly used herein. Other types of access modifications relating to different ones of the stored files 107 can be used in other embodiments.

The assignment module 134 in assigning classifications to respective ones of the stored files 107 may be more particularly configured to label the respective files with the assigned classifications in metadata of those respective files. The file metadata comprising the labels is then made accessible to the DLP system 126 for use in controlling performance of data loss prevention operations.

Additionally or alternatively, file labels provided by the assignment module 134 of the backend data classifier 125 can be used for any of a wide variety of other types of downstream processing that can make use of such labels. For example, the file labels can be used to facilitate provision of data protection operations not provided by the DLP system 126.

For example, in some embodiments, file labels such as "please audit," "SOX," "Financial," "Federal," "Honeypot/Decoy" or numerous others can be assigned to particular files by the assignment module 134 based at least in part on analysis of those files as performed by the file analyzer 130.

In some embodiments, the DLP system 126 may be configured to generate alerts relating to detection of activities relating to the stored files 107 that are indicative of likely data loss scenarios. Such alerts may be generated at least in part responsive to assignment of particular classifications to respective ones of the stored files 107.

The processing platform 105 is illustratively configured to take one or more remedial actions responsive to generation of alerts by the DLP system 126 or other system components. For example, such remedial actions may illustratively include performing additional data loss prevention operations such as further altering the manner in which files having certain classifications are accessible via the user devices 102. As a more particular example of a data loss prevention operation of this type, files having a particular classification level may be subject to additional access controls responsive to detection of one or more alerts indicative of a likely data loss scenario.

The classifications generated and assigned by the backend data classifier 125 in illustrative embodiments facilitate implementation of data loss prevention functionality in the computer network 100.

For example, the backend data classifier 125 is illustratively configured to label files or sets of files with respective classifications that are utilized by the DLP system 126 in determining the particular data loss prevention operations to be applied to those files. Such an approach enhances the performance of the DLP system 126, at least in part by automatically directing the DLP system 126 to focus particular data loss prevention techniques on certain ones of the stored files 107. This may involve the DLP system 126 altering access controls that are required for particular ones of the user devices 102 to access certain ones of the stored files 107 having particular assigned classifications.

In some embodiments, the backend data classifier 125 is configured so as to ensure that all or substantially all of the stored files 107 are assigned classifications. The classification assignments are illustratively performed in an out-of-band manner that can also be adapted to prevent other types of frontend attacks such as ransomware attacks, as will be described in more detail below. Moreover, the file analysis and associated classification assignment can be performed in real-time and/or during scheduled timeframes, so as to minimize adverse production impacts.

Illustrative embodiments can provide the ability to rapidly classify backend data, especially high volatility files or files which are at rest and/or commonly accessed by multiple ones of the user devices 102.

The backend data classifier 125 in the present embodiment is illustratively configured to operate in a "stealthy" manner and is therefore harder for an adversary or attacker to detect, modify or disable. It is therefore particularly well-suited for assisting the DLP system 126 in meeting the stringent security requirements that may be associated with particular enterprise computer network contexts.

For example, the backend data classifier 125 in some embodiments can be configured to trigger its analysis and classification responsive to changes made to files in real-time rather than on a schedule, so that malicious techniques used to avoid detection (e.g., change file, perform bad action, then revert to original file—all done in between configured file sweep inspection timelines) are not possible.

The processing platform 105 in some embodiments implements additional security functionality that utilizes at least the file analyzer 130 and the file history database 132 of the backend data classifier 125.

For example, other types of malicious activity that may be directed to computer network 100 can include ransomware attacks in which malware infecting one or more computers of the computer network 100 will systematically encrypt files on those computers and possibly other computers of the network. The attacker withholds the corresponding decryption key unless a ransom is paid by the victim.

Additional security functionality such as ransomware detection can also be provided in some embodiments utilizing file analyzer and file history database components similar to those of the backend data classifier 125.

For example, in some embodiments, the processing platform 105 can include a ransomware detector configured to generate a detection score for one or more sets of files stored in the storage device 106. Such a ransomware detector can include a detection score generator having a weighting module for applying weights to respective comparison results from a file analyzer in generating the detection score for the one or more sets of files. The ransomware detector may be further configured to generate an alert if the detection score for the one or more sets of files exceeds a specified threshold. Such an alert can be transmitted by the processing platform 105 over the network 104 to one or more of the security agent devices 110 of a network security system of computer network 100.

A ransomware detector may be configured to detect a ransomware attack while the attack is still in progress. For example, the object of the ransomware detector may be to identify the attack as quickly as possible in order to minimize the damage to the stored files 107. The ransomware detector in an embodiment of this type need not be configured to detect the original infection.

The detection score generator of the ransomware detector may comprise a weighting module for applying weights to respective comparison results from a file analyzer in generating the detection score for the one or more sets of files. Each such comparison result may correspond to a different comparison metric or criteria utilized to assess the likelihood that a ransomware attack is in progress. The detection score therefore reflects the likelihood that a ransomware attack is in progress.

An alert generator of the processing platform 105 may be configured to generate an alert if the detection score for the one or more sets of files exceeds a specified threshold. Such an alert may be transmitted by the processing platform 105 via network interface 124 over network 104 to one of the security agent devices 110 or to another processing device of a network security system of the computer network 100.

A ransomware detector of the type described above can be implemented as part of a security appliance installed on the processing platform 105. The backend data classifier 125 in some embodiments is also implemented in the form of a security appliance that may be the same as or different than a security appliance used to implement the ransomware detector. Accordingly, in some embodiments, the backend data classifier 125 is implemented on a security appliance that also includes a ransomware detector.

Additional details regarding ransomware detectors and associated security appliances that may be installed on the processing platform 105 are described in U.S. patent application Ser. No. 15/268,862, filed Sep. 19, 2016 (now U.S. Pat. No. 10,055,582) and entitled "Automated Detection and Remediation of Ransomware Attacks Involving a Storage Device of a Computer Network," which is incorporated by reference herein in its entirety.

It is to be appreciated, however, that ransomware detection functionality is not required in illustrative embodiments disclosed herein. Instead, ransomware detection functionality is considered an example of an additional type of security functionality that can be incorporated in processing platform 105 using components similar to those of the backend data classifier 125, such as a file analyzer and a file history database.

In addition to or in place of a ransomware detector of the type described above, one or more other types of malware detectors and/or virus detectors may be implemented in the computer network 100. Such additional or alternative detectors can each be implemented in a manner similar to that described above for the ransomware detector.

Embodiments that implement data loss prevention in combination with other types of security functionality such as ransomware detection will generally utilize different sets of analysis criteria for the respective different types of security functionality. For example, different sets of software and/or firmware, or different security appliances, may be used for data loss prevention and ransomware detection, as the particular criteria used for file analysis for each such type of security functionality is different.

At least portions of one or more of the components 130, 132 and 134 of the backend data classifier 125 may be implemented at least in part in the form of software that is stored in memory 122 and executed by processor 120.

In some embodiments, the processing platform 105 comprising the backend data classifier 125 is configured to take one or more remedial actions responsive to generation of alerts by the DLP system 126 or other system components. As indicated previously, such remedial actions may illustratively include data loss prevention operations such as altering the manner in which files having certain classifications are accessible via the user devices 102.

As noted above, the backend data classifier 125 of the processing platform 105 illustratively operates out-of-band relative to the user devices 102 such that no component of the backend data classifier 125 is implemented on any one of the user devices 102. For example, the backend data classifier 125 in the present embodiment does not require a user device agent or application component in order to classify the stored files 107. This is in contrast to conventional arrangements in which implementation of data classification functionality requires at least some modification of user devices or at least software components of such devices.

However, it is possible in some embodiments that one or more of the user devices 102 may each comprise a user device agent. Such user device agents can provide hints or other information to assist the backend data classifier 125 in its classification operations. As noted above, agents of this type can be configured to include ECAT functionality.

The file analyzer 130 of the backend data classifier 125 in some embodiments processes files substantially contemporaneously with the files being stored in the storage device 106 by one or more of the user devices 102 coupled to the storage device 106 over the network 104. As noted above, the processed files illustratively include at least a subset of the stored files 107 of the storage device 106. The files in some cases may be processed prior to or in conjunction with their storage in the storage device 106.

For example, the backend data classifier 125 is illustratively operative in a real-time processing mode in which the backend data classifier 125 receives copies of respective ones of the files from the storage device 106 in conjunction with the respective ones of the files being stored in the storage device 106.

Such a real-time processing mode can operate on-demand in conjunction with the normal storage of user files on the storage device 106. For example, the storage device 106 can copy a given file that is sent to it by one of the user devices 102 for storage and provide the copy of the file to the backend data classifier 125 for analysis, possibly via a service chain of the type utilized by a storage device when calling an external process. The performance impact is minimal as the storage device simply has to generate and provide the copy but does not have to wait for a return code or similar response from the processing platform 105. The processing platform 105 can delete the copy after the backend data classifier 125 has completed its analysis of the copy.

Numerous additional or alternative processing modes are possible for the backend data classifier 125, and the processing platform 105 may be configured to controllably switch the backend data classifier 125 between such multiple modes.

Other examples of processing modes for the backend data classifier 125 include a scheduled direct access processing mode and a transparent processing mode.

In the scheduled direct access processing mode, the backend data classifier 125 accesses the storage device 106 to identify and analyze at least a subset of the files that have been modified since a previous access by the backend data classifier 125 to the storage device 106. Such access by the backend data classifier 125 to the storage device 106 may be via the network 104 or direct access via a connection that bypasses the network 104.

By way of example, in one possible implementation of the scheduled direct access processing mode, the backend data classifier 125 directly accesses the storage device on a periodic basis. It "walks" the entire storage device and inspects files that have been changed since the last invocation. Such an arrangement is more likely to impact performance and so may be scheduled to run outside of normal business hours. This mode allows the backend data classifier 125 to "macro" inspect across multiple sets of files.

In the transparent processing mode, the backend data classifier 125 processes the files in a manner transparent to the storage device 106, as the files are provided to the storage device 106 for storage therein. For example, the files may be provided to the storage device 106 from the user devices 102, with the backend data classifier 125 in effect being placed in-line with the data path between the user devices 102 and the storage device 106, or possibly receiving copies of the files via a tap from that data path. In such arrangements, the backend data classifier 125 analyzes the files as they are provided to the storage device 106 but without the storage device 106 necessarily being aware that the backend data classifier 125 is doing so.

The file analyzer 130 in comparing characteristics relating to the current state of the files with information stored in the file history database 132 illustratively applies a plurality of evaluation criteria to a given one of the files to obtain individual comparison results for respective ones of the evaluation criteria for the given file. Such file analysis performed individually over multiple files can be combined and used to generate one or more combined comparison results for the multiple files.

In some embodiments, the backend data classifier 125 further comprises a weighting module utilized to apply weights to respective comparison results from the file analyzer 130 in generating the classifications for respective files or sets of files. For example, different weights may be applied to respective comparison results that are generated using respective different comparison metrics or criteria. Accordingly, a given file or set of files can be compared against multiple distinct metrics or other criteria that are indicative of the particular characteristics of a classification, and the corresponding comparison results weighted in accordance with the respective reliabilities of the multiple distinct metrics or other criteria in assigning the classification to the file or set of files.

For example, in one possible implementation, the backend data classifier 125 performs several processing operations on each of a plurality of files in order to generate for each of the files a measure of the confidence that the file should be assigned a particular classification. This illustratively includes applying a series of evaluation methods each based on a different comparison metric or other criteria and generating an individual score for each evaluation method. The individual scores are combined using respective weights to obtain a classification score for the file. Multiple such scores can be combined for a set of files to obtain a classification score for that set of files.

The evaluation methods in some embodiments can include one or more evaluation methods that are performed externally to the backend data classifier 125, such as external processes or external determinants, possibly implemented in another processing device of the computer network 100. For example, such external processes or external determinants can be used to determine if files have been subject to certain types of activities commonly associated with known types of data loss scenarios in the computer network 100.

A given implementation of the backend data classifier 125 can incorporate additional or alternative evaluation methods. Such evaluation methods are considered examples of what are more generally referred to herein as comparisons of characteristics of a current state of a file or files with information stored in a file history database.

The file history database 132 is updated with comparison results from the evaluation methods as well as associated individual and composite classification scores and corresponding information such as file metadata and file relationships.

It is to be appreciated that this particular arrangement of components 130, 132 and 134 illustrated in the backend data classifier 125 of the FIG. 1 embodiment is presented by way of example only, and alternative arrangements can be used in other embodiments. Moreover, the particular set of computer network elements shown in the embodiment of FIG. 1 for automatically classifying files stored on one or more storage devices for purposes of facilitating data loss prevention is presented by way of illustrative example only, and in other embodiments additional or alternative computer network elements may be used. Thus, another embodiment may include additional or alternative systems, devices and other network entities, as well as different arrangements of modules and other components.

By way of example, in other embodiments, the processing platform 105 can be implemented in a distributed manner, with particular modules or other components thereof being distributed over multiple processing devices of the computer network 100.

In some embodiments, the processing platform 105 is a part of or otherwise associated with another system, such as, for example, a security operations center (SOC) or a critical incident response center (CIRC).

Additionally or alternatively, the processing platform 105 can be part of or incorporate an otherwise conventional security analytics system, such as the RSA Security Analytics system commercially available from RSA.

Other embodiments can implement the processing platform 105 and its associated backend data classifier 125 as part of or in conjunction with a security information and event management (STEM) system, such as an enVision® platform, also commercially available from RSA. Such an SIEM system is also considered another possible example of a "network security system" as that term is broadly used herein.

An exemplary process utilizing backend data classifier 125 of the processing platform 105 in computer network 100 will now be described in more detail with reference to the flow diagram of FIG. 2. It is to be understood that this particular process is only an example, and additional or alternative processes can be carried out in other embodiments.

In this embodiment, the process includes steps 200 through 208. These steps are assumed to be performed in processing platform 105 at least in part by the backend data classifier 125, utilizing its components 130, 132 and 134, and by the DLP system 126, possibly operating in conjunction with other computer network components, although the process can be applied in other types of computer networks.

In step 200, a backend data classifier is associated with at least one storage device. Such an association can be established, for example, by incorporating the backend data classifier into the storage device, or by establishing a connection between the backend data classifier and the storage device over a network.

It is also possible that a single backend data classifier can be associated with multiple storage devices, or that a given computer network can include multiple backend data classifiers, each associated with a different one of the multiple storage devices. Numerous alternative types of associations between one or more backend data classifiers and one or more storage devices can be established in a given embodiment.

The backend data classifier is illustratively configured to include a file analyzer, file history and assignment module as in the illustrative embodiment of FIG. 1. In conjunction with such a configuration of the backend data classifier, weights may be established for application to respective comparison results in the backend data classifier. Parameters such as particular comparison metrics or other criteria to be utilized by the backend data classifier can be at least partially determined in this step.

It is assumed for purposes of this embodiment that the storage device is accessible to at least one user device over a network and further that the backend data classifier operates out-of-band relative to the user device in that no component of the backend data classifier is implemented on the user device.

In step 202, the backend data classifier compares characteristics relating to current states of respective files stored in the storage device with information stored in a file history database. The file history database can be internal to the backend data classifier, as in the illustrative embodiment of FIG. 1, or can be implemented at least in part externally to the backend data classifier.

The comparisons performed in step 202 can be based at least in part on file analysis applied to characteristics of the file, such as metadata of the file or its corresponding directory, and its relationships to other files. More particularly, the current state of a given file in this embodiment is assumed to be reflected in at least one of metadata, content, context or other information of that file. Such information is assumed to be encompassed by the term "characteristics relating to a current state of the files," as that term is intended to be broadly construed herein. Also, a "file history database" as the term is used herein is similarly intended to be broadly construed to encompass any arrangement of stored file characteristic information suitable for use in file analysis. Thus, file history information should not be construed as being limited to any particular format.

In step 204, the backend data classifier assigns classifications to respective ones of the files stored in the storage device based at least in part on results of the comparisons. A given such classification can be generated for one or more sets of files stored in the storage device. The generation of a classification in this embodiment may involve, for example, comparing characteristics relating to a current state of the files with information stored in a file history database, applying weights to respective comparison results, and generating the classification based at least in part on the weighted comparison results.

Example classifications that may be applied to different ones of the stored files include External Public, Internal Use, Restricted and Highly Restricted, although a wide variety of other classifications can be used in other embodiments.

In step 206, different data loss prevention operations are performed on different ones of the files stored in the storage device based at least in part on their respective assigned classifications. For example, files having a first classification may be subject to a first set of data loss prevention operations, while files having a second classification different than the first classification are subject to a second set of data loss prevention operations different than the first set of data loss prevention operations.

In some embodiments, an alert is generated and provided to a security agent and one or more automated remedial actions are taken. For example, the alert may be transmitted over the network 104 to one of the security agent devices 110. Alerts can be generated using any of a wide variety of different formats and protocols. These include, for example, SMTP, Rsyslog, XML, FTP and custom API scripts.

In place of or in addition to transmission of an alert to a security agent device, automated processing may be applied to an alert in at least one processing device of an SOC, CIRC, STEM system, or other type of network security system. Alerts can therefore be used to trigger actions such as generation of a security ticket or transmission to an incident response team or associated console or application.

The automated remedial actions can illustratively include, for example, quarantining one or more of the user devices 102 that are suspected as being associated with data loss, or altering access controls associated with certain ones of the stored files having a particular designated classification. Such remedial actions are also considered examples of "data loss prevention operations" as that term is broadly used herein.

In step 208, the file history database is updated based on the assigned classifications and the associated data loss prevention operations. The updated file history database is then utilized in subsequent iterations of the process.

Although not illustrated in the figure, machine learning functionality may be incorporated into the backend data classifier in order to learn which comparison metrics or other criteria are best at producing classifications that facilitate data loss prevention within the computer network 100. Such machine learning functionality can utilize feedback received from security personnel that indicates the quality of previous classification assignments in the context of subsequent data loss prevention operations.

As mentioned previously, the backend data classifier may be switchable between multiple operating modes, illustratively including one or more of the following operating modes:

1. A real-time processing mode in which the backend data classifier receives copies of respective ones of the files from the storage device in conjunction with the respective ones of the files being stored in the storage device.

2. A scheduled direct access processing mode in which the backend data classifier accesses the storage device to identify and analyze at least a subset of the files that have been modified since a previous access by the backend data classifier of the storage device.

3. A transparent processing mode in which the backend data classifier processes the files in a manner transparent to the storage device as the files are provided to the storage device for storage therein.

Again, these are just examples of different operating modes for the backend data classifier, and additional or alternative modes can be used in other embodiments. Also, a backend data classifier in some embodiments is configured to operate in only a single mode, and is not switchable between multiple modes.

Figure 2:
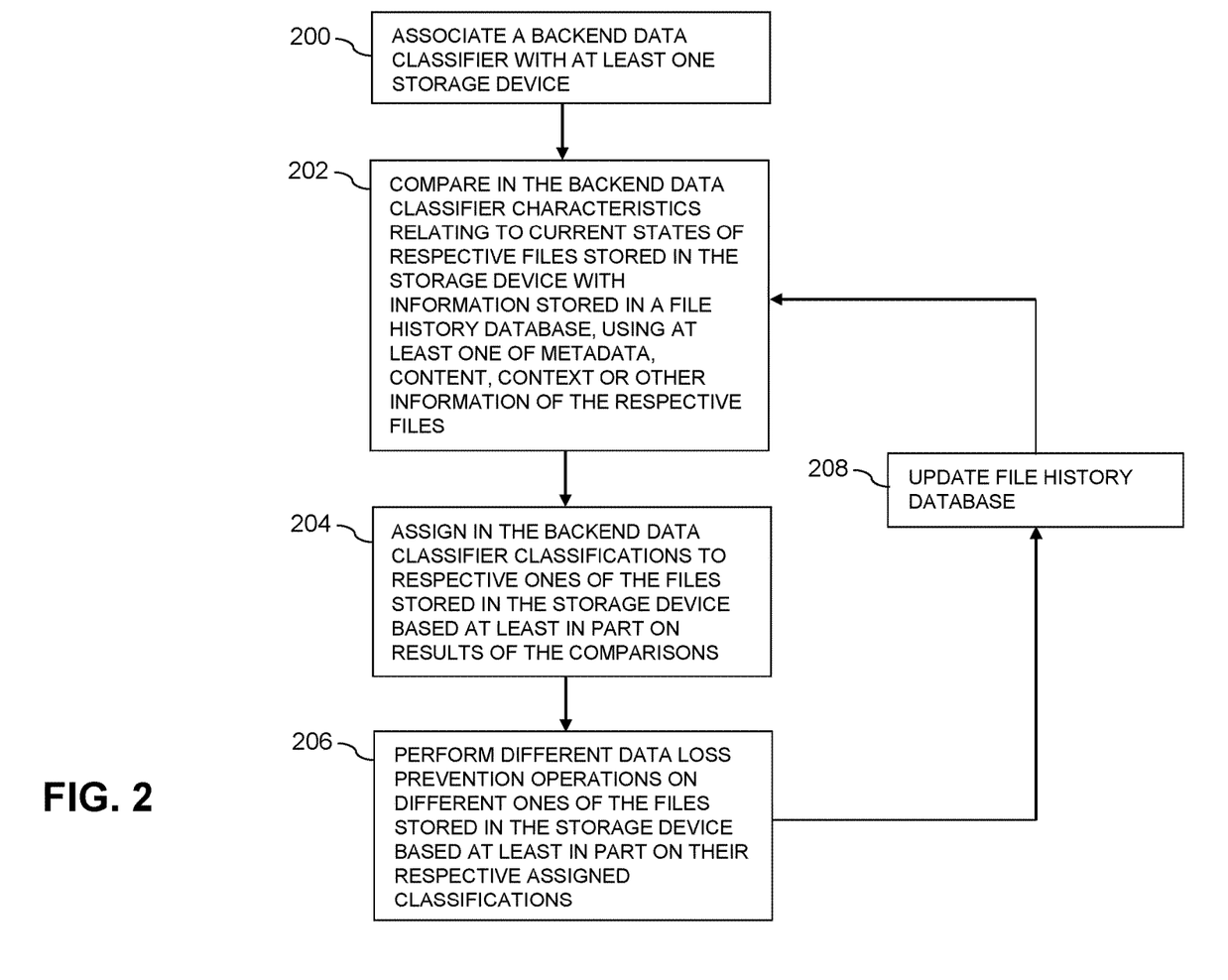
FIG. 2 is a flow diagram of a process for backend data classification to facilitate data loss prevention in an illustrative embodiment.

It should be understood that additional instances of steps 200 through 208 of the FIG. 2 process can be performed for different sets of files, possibly on different storage devices, or may otherwise be repeated periodically in order to ensure that backend data classification is accurately and efficiently performed within the computer network 100.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to perform backend data classification in order to facilitate data loss prevention. For example, the ordering of the process steps may be varied in other embodiments, or certain steps may be performed concurrently with one another rather than serially. Also, as indicated previously, the process steps or subsets thereof may be repeated periodically in conjunction with respective distinct instances of backend data classification for different sets of files or different storage devices.

The above-described illustrative embodiments provide significant advantages relative to conventional approaches.

For example, some embodiments are configured to provide particularly accurate and efficient backend data classification by interacting directly with storage devices rather than user devices. Such "backend" behavioral analysis advantageously allows for more accurate data classification, thereby facilitating performance of data loss prevention operations based at least in part on such classification. Other types of data loss protection can be similarly controlled using the assigned classifications.

A backend data classifier in some embodiments is illustratively configured to operate in a "stealthy" manner and is therefore harder for an adversary or attacker to detect, modify or disable. It is therefore particularly well-suited for assisting a data loss prevention system in meeting the stringent security requirements that may be associated with particular enterprise computer network contexts.

Some embodiments additionally utilize the backend data classification for other types of security functionality, such as detection of on-going ransomware attacks, thereby helping to minimize the damage that the ransomware attack can inflict on the computer network. Early detection of an on-going ransomware attack using the techniques disclosed herein not only limits the extent of the damage to the stored files but can in some cases allow the cryptographic key being used in the attack to be captured.

In addition, the backend data classification can be implemented in illustrative embodiments without any modification to user devices or their associated applications.

Furthermore, a backend data classifier as disclosed herein can be configured to call external processes and to incorporate their responses into classification actions. Such an arrangement can further increase the accuracy of the backend data classification process, leading to additional improvements in the performance of a data loss prevention system that utilizes the backend data classification results to determine appropriate data loss prevention operations to be performed within the computer network.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

The particular processing platforms described above are presented by way of example only, and a given computer network such as computer network 100 may include additional or alternative processing platforms, as well as numerous distinct processing platforms in any combination, with each such platform comprising one or more computers, storage devices, security appliances and other types of processing devices.

The processing devices and other computer network components referred to herein can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of processing platforms, storage devices, data classifiers, data loss prevention systems and other components can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. An apparatus comprising:
a processing platform comprising at least one processing device having a processor coupled to a memory;
the processing platform being associated with at least one storage device;
the processing platform comprising:
a backend data classifier configured for communication with a data loss prevention system;
the backend data classifier comprising:
a file analyzer configured to compare characteristics relating to current states of respective files stored in the storage device with information stored in a file history database; and
an assignment module configured to assign classifications to respective ones of the files stored in the storage device based at least in part on comparison results from the file analyzer;
wherein the data loss prevention system is configured to perform different data loss prevention operations on different ones of the files stored in the storage device based at least in part on their respective assigned classifications;
wherein the backend data classifier is controllably switchable between a plurality of different operating modes, the operating modes comprising:
a transparent processing mode in which the backend data classifier processes the files in a manner transparent to the storage device as the files are provided to the storage device for storage therein, with the backend data classifier (i) being placed in-line with a data path between a user device and the storage device or (ii) being configured to receive copies of the files via a tap from the data path; and
one or more additional operating modes comprising at least one of a real-time processing mode and a scheduled processing mode; and
wherein the file analyzer and the assignment module of the backend data classifier are executed by the at least one processing device.

2. The apparatus of claim 1 wherein the assignment module in assigning classifications to respective ones of the files labels the respective files with the assigned classifications in metadata of those respective files and further wherein the metadata is made accessible to the data loss prevention system.

3. The apparatus of claim 1 wherein the backend data classifier is implemented externally to the storage device.

4. The apparatus of claim 1 wherein the backend data classifier is implemented at least in part internally to the storage device.

5. The apparatus of claim 1 wherein the storage device is accessible to at least one user device over a network and further wherein the backend data classifier operates out-of-band relative to the user device such that no component of the backend data classifier is implemented on the user device.

6. The apparatus of claim 1 wherein the backend data classifier is co-located with the storage device.

7. The apparatus of claim 1 wherein the backend data classifier is implemented in cloud infrastructure remote from the storage device.

8. The apparatus of claim 1 wherein the file analyzer of the backend data classifier processes the files substantially contemporaneously with the files being stored in the storage device by one or more user devices coupled to the storage device over a network.

9. The apparatus of claim 1 wherein the real-time processing mode comprises a real-time processing mode in which the backend data classifier receives copies of respective ones of the files from the storage device in conjunction with the respective ones of the files being stored in the storage device.

10. The apparatus of claim 1 wherein the scheduled processing mode comprises a scheduled direct access processing mode in which the backend data classifier accesses the storage device to identify and analyze at least a subset of the files that have been modified since a previous access by the backend data classifier to the storage device.

11. The apparatus of claim 1 wherein the file analyzer in comparing characteristics relating to the current states of the files with information stored in the file history database applies a plurality of evaluation criteria to a given one of the files to obtain individual comparison results for respective ones of the evaluation criteria for the given file.

12. The apparatus of claim 1 wherein the file analyzer in comparing characteristics relating to the current states of the files with information stored in the file history database performs combined analysis over multiple ones of the files and generates one or more combined comparison results for the multiple files.

13. The apparatus of claim 1 wherein the processing platform further comprises at least one of a ransomware detector, a malware detector and a virus detector wherein the at least one of the ransomware detector, the malware detector, and the virus detector, is configured to generate a detection score for one or more sets of files stored in the storage device, a given such detector being configured to generate an alert if the detection score for the one or more sets of files exceeds a specified threshold, wherein the alert is transmitted by the processing platform over a network to a processing device of a network security system, and wherein said at least one of the ransomware detector, the malware detector and the virus detector are each executed by the at least one processing device.

14. A method comprising:
associating a backend data classifier with at least one storage device;
comparing in the backend data classifier characteristics relating to current states of respective files stored in the storage device with information stored in a file history database;
assigning in the backend data classifier classifications to respective ones of the files stored in the storage device based at least in part on results of the comparing;
performing different data loss prevention operations on different ones of the files stored in the storage device based at least in part on their respective assigned classifications; and
controllably switching the backend data classifier between a plurality of different operating modes, the operating modes comprising:
a transparent processing mode in which the backend data classifier processes the files in a manner transparent to the storage device as the files are provided to the storage device for storage therein, with the backend data classifier (i) being placed in-line with a data path between a user device and the storage device or (ii) being configured to receive copies of the files via a tap from the data path; and
one or more additional operating modes comprising at least one of a real-time processing mode and a scheduled processing mode;
wherein the backend data classifier is implemented by at least one processing device comprising a processor coupled to a memory; and
wherein the file analyzer and the assignment module of the backend data classifier are executed by the at least one processing device.

15. The method of claim 14 wherein the storage device is accessible to at least one user device over a network and further wherein the backend data classifier operates out-of-band relative to the user device such that no component of the backend data classifier is implemented on the user device.

16. The method of claim 14 wherein
the real-time processing mode comprises a real-time processing mode in which the backend data classifier receives copies of respective ones of the files from the storage device in conjunction with the respective ones of the files being stored in the storage device; and
the scheduled direct access processing mode comprises a scheduled processing mode in which the backend data classifier accesses the storage device to identify and analyze at least a subset of the files that have been modified since a previous access by the backend data classifier to the storage device.

17. A computer program product comprising a non-transitory processor-readable storage medium having stored therein program code of one or more software programs, wherein the program code when executed by a processing platform comprising at least one processing device causes said processing platform:
to associate a backend data classifier with at least one storage device;
to compare in the backend data classifier characteristics relating to current states of respective files stored in the storage device with information stored in a file history database;
to assign in the backend data classifier classifications to respective ones of the files stored in the storage device based at least in part on results of the comparing;
to perform different data loss prevention operations on different ones of the files stored in the storage device based at least in part on their respective assigned classifications; and
to controllably switch the backend data classifier between a plurality of different operating modes, the operating modes comprising:
a transparent processing mode in which the backend data classifier processes the files in a manner transparent to the storage device as the files are provided to the storage device for storage therein, with the backend data classifier (i) being placed in-line with a data path between a user device and the storage device or (ii) being configured to receive copies of the files via a tap from the data path; and
one or more additional operating modes comprising at least one of a real-time processing mode and a scheduled processing mode; and
wherein the file analyzer and the assignment module of the backend data classifier are executed by the at least one processing device.

18. The computer program product of claim 17 wherein the storage device is accessible to at least one user device over a network and further wherein the backend data classifier operates out-of-band relative to the user device such that no component of the backend data classifier is implemented on the user device.

19. The computer program product of claim 17 wherein
the real-time processing mode comprises a real-time processing mode in which the backend data classifier receives copies of respective ones of the files from the storage device in conjunction with the respective ones of the files being stored in the storage device; and
the scheduled direct access processing mode comprises a scheduled processing mode in which the backend data classifier accesses the storage device to identify and analyze at least a subset of the files that have been modified since a previous access by the backend data classifier to the storage device.

20. The computer program product of claim 17 wherein the assignment module in assigning classifications to respective ones of the files labels the respective files with the assigned classifications in metadata of those respective files and further wherein the metadata is made accessible to the data loss prevention system.

* * * * *

UNITED STATES PATENT AND TRADEMARK OFFICE
CERTIFICATE OF CORRECTION

PATENT NO. : 10,860,730 B1  
APPLICATION NO. : 15/897224  
DATED : December 8, 2020  
INVENTOR(S) : James L. Weaver et al.

Page 1 of 1

It is certified that error appears in the above-identified patent and that said Letters Patent is hereby corrected as shown below:

In the Claims

Claim 14, Column 21, Line 56 delete "wherein the file analyzer and the assignment module" and insert therefor --wherein a file analyzer and an assignment module--

Claim 16, Column 22, Lines 4-5 delete "the scheduled direct access processing mode comprises a scheduled processing mode" and insert therefor --the scheduled processing mode comprises a scheduled direct access processing mode--

Claim 17, Column 22, Line 44 delete "wherein the file analyzer and the assignment module" and insert therefor --wherein a file analyzer and an assignment module--

Claim 19, Column 22, Lines 59-60 delete "the scheduled direct access processing mode comprises a scheduled processing mode" and insert therefor --the scheduled processing mode comprises a scheduled direct access processing mode--

Signed and Sealed this  
Fifth Day of January, 2021

Andrei Iancu  
*Director of the United States Patent and Trademark Office*